(12) United States Patent
Forkert

(10) Patent No.: US 11,982,569 B2
(45) Date of Patent: May 14, 2024

(54) SPECTROGRAPHIC SYSTEM THAT COMPRESSES FOURIER TRANSFORM SPECTRAL DATA AND ASSOCIATED METHODS

(71) Applicant: EAGLE TECHNOLOGY, LLC, Melbourne, FL (US)

(72) Inventor: Richard D. Forkert, Fort Wayne, IN (US)

(73) Assignee: EAGLE TECHNOLOGY, LLC, Melbourne, FL (US)

( * ) Notice: Subject to any disclaimer, the term of this patent is extended or adjusted under 35 U.S.C. 154(b) by 63 days.

(21) Appl. No.: 17/445,500

(22) Filed: Aug. 20, 2021

(65) Prior Publication Data

US 2023/0063357 A1   Mar. 2, 2023

(51) Int. Cl.
*G01J 3/453* (2006.01)
*B64G 1/10* (2006.01)

(52) U.S. Cl.
CPC .............. *G01J 3/453* (2013.01); *B64G 1/105* (2013.01)

(58) Field of Classification Search
CPC .... G06K 9/6247; G06K 9/624; G06K 9/6232; G06K 9/6248; G06V 20/13; G06V 10/52;
(Continued)

(56) References Cited

U.S. PATENT DOCUMENTS 7,148,996 B2   12/2006   Yeo et al.
7,283,684 B1 *  10/2007   Keenan ................... G06V 10/52
                                                            382/277
(Continued)

FOREIGN PATENT DOCUMENTS

| CN | 103501438 | 1/2014 |
|----|-----------|--------|
| CN | 110020407 | 7/2019 |
| CN | 111665503 | 9/2020 |
| CN | 112348912 | 2/2021 |

(Continued)

OTHER PUBLICATIONS

Huang et al., "Vector Quantization with Self-Resynchronizing Coding for Lossless Compression and Rebroadcast of the NASA Geostationary Imaging Fourier Transform Spectromieter (GIFTS) Data," Proc. SPIE 7084, Satellite Data Compression, Communications, and Processing IV, 708408, Sep. 5, 2008, doi: 10.1117/12.800914, 10 pages.

(Continued)

*Primary Examiner* — Neel D Shah
*Assistant Examiner* — Martin Walter Braunlich
(74) *Attorney, Agent, or Firm* — ALLEN, DYER, DOPPELT, + GILCHRIST, P.A. Attorneys at Law

(57) ABSTRACT

A spectrographic system includes a space-borne spectrometer in communication with a ground-based processor. The space-borne spectrometer may include an interferometer, a detector array downstream from the interferometer, and a spectrometer controller configured to cooperate with the detector array to collect Fourier Transform Spectral (FTS) data, generate Principle Component Analysis (PCA) scores from the collected FTS data, generate an approximate interferogram based upon the PCA scores and the collected FTS data, generate residuals based upon the approximate interferogram, and generate compressed FTS data based upon the PCA scores and residuals to be sent to the ground-based processor.

20 Claims, 10 Drawing Sheets

(58) Field of Classification Search
CPC .. G06V 10/58; G06V 10/7715; G06V 20/194; G06V 10/40; G06V 20/64; H04N 19/50; H04N 19/63; H04N 1/64; H04N 19/124; H04N 19/146; H04N 19/15; H04N 19/154; H04N 19/186; H04N 19/192; H04N 19/34; H04N 19/42; H04N 19/463; H04N 19/48; H04N 19/59; H04N 19/625; H04N 19/91; H04N 19/94; H04N 19/97; G06T 9/00; G06T 11/001; G06T 9/004; G06F 17/18; G06F 16/283; G06F 17/14; G06F 17/175; H03M 7/30; H03M 7/3059; H03M 7/3082; H03M 7/70; G01S 13/9021; G01S 13/9023; G01J 3/453; B64G 1/105

See application file for complete search history.

(56) References Cited

U.S. PATENT DOCUMENTS

| | | | |
|---|---|---|---|
| 7,319,796 B1 | 1/2008 | Sharp | |
| 7,400,772 B1 | 7/2008 | Keenan | |
| 7,907,784 B2 | 3/2011 | Gladkova et al. | |
| 8,355,591 B2* | 1/2013 | Henrichs | H04N 19/11 |
| | | | 382/248 |
| 8,432,974 B2 | 4/2013 | Chen | |
| 8,478,061 B2 | 7/2013 | Robinson et al. | |
| 8,730,068 B2 | 5/2014 | Shaylor et al. | |
| 8,879,812 B2* | 11/2014 | Levenson | G01J 3/4406 |
| | | | 600/475 |
| 9,031,336 B2 | 5/2015 | Deforest | |
| 9,123,091 B2 | 9/2015 | Robinson et al. | |
| 9,479,799 B1 | 10/2016 | Riasati | |
| 10,656,017 B2* | 5/2020 | Maurer | G01B 9/02089 |
| 2020/0083902 A1 | 3/2020 | Martens et al. | |

FOREIGN PATENT DOCUMENTS

| | | |
|---|---|---|
| EP | 2430975 | 3/2012 |
| EP | 3347852 | 7/2018 |
| WO | 2017041842 | 3/2017 |

OTHER PUBLICATIONS

Xu et al., "Principal Component Analysis of Multiple-Beam Fizeau Interferograms with Random Phase Shifts," Optics Express vol. 19, Issue 15, (2011) •https://doi.org/10.1364/OE.19.014464, 9 pages.

Deng et al., "Advanced Principal Component Analysis Method for Phase Reconstruction," Optics Express vol. 23, Issue 9, (2015), https://doi.org/10.1364/OE.23.012222, 10 pages.

\* cited by examiner

| 5-bit values | | 10-bit values | | 13-bit values | |
|---|---|---|---|---|---|
| Decimal | Twos-compliment | Decimal | Twos-compliment | Decimal | Twos-compliment |
| 0 | 0 0000 | 0 | 00 0000 0000 | 0 | 0 0000 0000 0000 |
| 1 | 0 0001 | 1 | 00 0000 0001 | 1 | 0 0000 0000 0001 |
| 2 | 0 0010 | 2 | 00 0000 0010 | 2 | 0 0000 0000 0010 |
| 14 | 0 1110 | 510 | 01 1111 1110 | 4094 | 0 1111 1111 1110 |
| 15 | 0 1111 | 511 | 01 1111 1111 | 4095 | 0 1111 1111 1111 |
| -16 | 1 0000 | -512 | 10 0000 0000 | -4096 | 1 000 0000 0000 |
| -15 | 1 0001 | -511 | 10 0000 0001 | -4095 | 1 000 0000 0001 |
| -14 | 1 0010 | -510 | 10 0000 0010 | -4094 | 1 000 0000 0010 |
| -2 | 1 1110 | -2 | 11 1111 1110 | -2 | 1 111 1111 1110 |
| -1 | 1 1111 | -1 | 11 1111 1111 | -1 | 1 111 1111 1111 |

| Symbol | Bits | Codeword | Symbol | Bits | Codeword | Symbol | Bits | Codeword |
|---|---|---|---|---|---|---|---|---|
| 0 | 9 | 010001110 | 8 | 4 | 0010 | 16 | 5 | 00010 |
| 1 | 9 | 010001100 | 9 | 4 | 0000 | 17 | 5 | 01110 |
| 2 | 8 | 01000001 | 10 | 3 | 110 | 18 | 6 | 010011 |
| 3 | 7 | 0100010 | 11 | 3 | 100 | 19 | 7 | 0100001 |
| 4 | 6 | 010010 | 12 | 3 | 101 | 20 | 8 | 01000000 |
| 5 | 5 | 01111 | 13 | 3 | 111 | 21 | 9 | 010001101 |
| 6 | 5 | 00011 | 14 | 4 | 0011 | 22 | 9 | 010001111 |
| 7 | 4 | 0110 | 15 | 4 | 0101 | | | |

SPECTROGRAPHIC SYSTEM THAT COMPRESSES FOURIER TRANSFORM SPECTRAL DATA AND ASSOCIATED METHODS

FIELD OF THE INVENTION

The present invention relates to the field of spectrometry, and, more particularly, to a space-borne spectrometer that compresses Fourier Transform Spectral (FTS) data and related methods.

BACKGROUND OF THE INVENTION

Satellite systems may provide Earth observations from geostationary orbit and may supply vital data to address environmental challenges of the future and support weather, ocean and climate operations in the United States. An example is the Geostationary Operational Environmental Satellite-R (GEOS-R) series operated by the National Oceanic and Atmospheric Administration (NOAA) that addresses the need for early and accurate detection of tornadoes, wildfires, and other extreme weather events to help keep people safe and out of harm's way. One technique to collect high-quality hyperspectral data related to the imaging of the Earth's weather, climate, oceans and the environment uses a Fourier Transform Spectrometer (FTS) interferometer that collects the constructive and destructive interference of light coming into the device by sending the light down different optical paths of different lengths. The length of one path varies while the other path is constant to produce the data known as an interferogram. To obtain the desired spectrum for analysis, this data is transformed using the Fourier transform, and hence, the name Fourier Transform Spectrometer.

The horizontal resolution, spatial coverage and interval requirements for this hyperspectral Fourier Transform Spectrometer data makes it difficult to downlink this data from satellite systems to ground stations. Next generation Fourier Transform Spectrometers are capable of producing thousands of spectral channels using arrays having tens of thousands of detector elements to achieve full coverage in half-hour intervals. This data is collected at Geosynchronous Earth Orbit (GEO) and allows the National Weather Service (NWS) and National Oceanic and Atmospheric Administration (NOAA) scientists to monitor and understand severe weather formations in near-real time and improve their forecasting capabilities.

An example Fourier Transform Spectrometer system is the current low-Earth orbiting Crosstrack Infrared Spectrometer (CrIS) that collects three spectral bands of data with an array of detector elements and generates 1.8 Mbps of data to be transmitted to the ground. This new GEO capability may collect two bands generating raw data of over 500 Mbps that is required to be transmitted to the ground over a 130 Mbps communications downlink. It is difficult to reduce the raw data rate to achieve this goal. Many existing hyperspectral compression techniques may require the data to be in a spectral form, which may require extensive on-board processing.

Some current systems attempt to address this problem. For example, the Crosstrack Infrared Spectrometer (CrIS) reduces data rate requirements by decimating and bit-trimming the data, resulting in lossless data compression. The raw data may be decimated by a fairly large factor, e.g., between about 10 and 20, which means the number of samples are reduced by that factor by only keeping every Nth sample. Decimation requires a preprocessing step to maintain good signal integrity by digitally filtering the signal to avoid aliasing. This type of digital filtering uses a complex valued filter. Even though the originally collected sample values are not complex, any values being compressed are complex, and as a result, this technique may be insufficient to achieve the data rate reduction useful for geosynchronous Earth orbit sounder missions such as for use with the Geostationary and Extended Orbit (GEO-XO) imager.

Another proposal is the Geostationary Imaging Fourier Transform Spectrometer (GIFTS), Vector Quantization (VQ)-based algorithm as applied to interferograms. That technique may result in adequate compression ratios, but applying vector quantization to the data to select each code book entry may be processing intensive. For example, in a GIFTS VQ algorithm approach, a neighboring pixel average may be calculated and spatial average values determined. The spatial average may be subtracted from data and the VQ code book selection as a search may be accomplished with a code book entry subtracted from the data and the difference encoded, which may result in excessive processing on board a satellite.

The Geostationary Interferometric Infrared Sounder (GIIRS) device accomplishes near lossless compression on interferograms, and incorporates decimation, quantization, and Huffman coding, but that device does not achieve a required compression rate. Other techniques may apply hypercube spectral-based compression algorithms that require extensive on-board processing to convert to spectrums before compression, such as the system for the Consultative Committee for Space Data Systems (CCSDS) 123.0, M-CALIC (IASIEU) sounder as an atmospheric sounding interferometer. Thus, this technique may also be limited in its use.

SUMMARY OF THE INVENTION

In general, a spectrographic system may include a space-borne spectrometer and a ground-based processor in communication therewith. The space-borne spectrometer may include an interferometer, a detector array downstream from the interferometer, and a spectrometer controller configured to cooperate with the detector array to collect Fourier Transform Spectral (FTS) data, generate Principle Component Analysis (PCA) scores from the collected FTS data, generate an approximate interferogram based upon the PCA scores and the collected FTS data, generate residuals based upon the approximate interferogram, and generate compressed FTS data based upon the PCA scores and residuals to be sent to the ground-based processor.

The spectrometer controller may be configured to encode the PCA scores, and configured to encode the residuals. The spectrometer controller may also be configured to correlate the collected FTS data against a plurality of PCA eigenvectors and generate the approximate interferogram based thereon. In an example, the spectrometer controller may be configured to buffer the collected FTS data, and subtract the approximate interferogram from the buffered collected FTS data.

The ground-based processor may be configured to generate uncompressed FTS data from the compressed FTS data and the spectrometer controller may be configured to encode the PCA scores, and encode the residuals. The ground-based processor may include a ground-based controller configured to decode the encoded PCA scores from the compressed FTS data, decode the encoded residuals from the compressed FTS data, and generate decompressed FTS data from the decoded encoded PCA scores and decoded encoded residuals. The ground-based controller may also be configured to use a plurality of PCA eigenvectors to reconstruct the approximate interferogram, and may be configured to add the residuals to the reconstructed approximate interferogram to generate the decompressed FTS data.

Another aspect is directed to a spectrographic method of operating a space-borne spectrometer controller that may cooperate with a detector array to collect Fourier Transform Spectral (FTS) data, generate Principle Component Analysis (PCA) scores from the collected FTS data, generate an approximate interferogram based upon the PCA scores and the collected FTS data, generate residuals based upon the approximate interferogram, and generate compressed FTS data based upon the PCA scores and residuals to be sent to a ground-based processor.

BRIEF DESCRIPTION OF THE DRAWINGS

Other objects, features and advantages of the present invention will become apparent from the detailed description of the invention which follows, when considered in light of the accompanying drawings in which.

DETAILED DESCRIPTION

The present description is made with reference to the accompanying drawings, in which exemplary embodiments are shown. However, many different embodiments may be used, and thus, the description should not be construed as limited to the particular embodiments set forth herein. Rather, these embodiments are provided so that this disclosure will be thorough and complete. Like numbers refer to like elements throughout, and prime notation is used to indicate similar elements in different embodiments.

Figure 1:
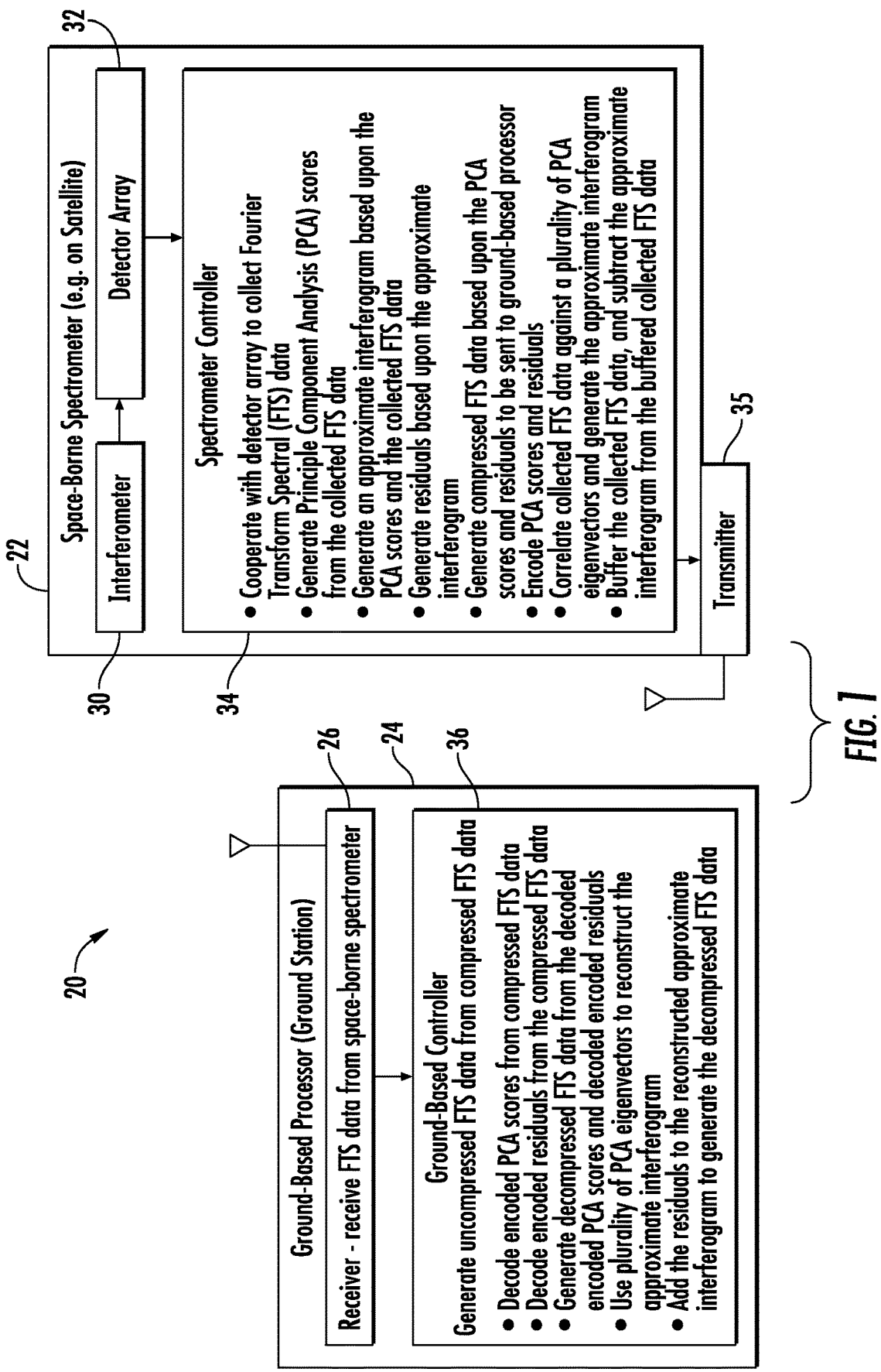
FIG. 1 is a block diagram of the spectrographic system according to the invention.

Referring initially to FIG. 1, a spectrographic system is illustrated generally at 20. The system 20 includes a space-borne spectrometer 22 such as positioned on a satellite and configured to generate compressed Fourier Transform Spectral (FTS) data, and a ground-based processor 24 such as part of a ground station and having a receiver 26 configured to receive the FTS data from the space-borne spectrometer. The space-borne spectrometer 22 includes an interferometer 30, a detector array 32 downstream from the interferometer, and a spectrometer controller 34 that is configured to cooperate with the detector array to collect the Fourier Transform Spectral (FTS) data. The spectrometer controller 34 generates principal component analysis (PCA) scores from the collected FTS data and generates an approximate interferogram based upon the PCA scores and the collected FTS data. Residuals are generated based upon the approximate interferogram. The spectrometer controller 34 generates compressed FTS data based upon the PCA scores and residuals to be sent to the ground-based processor 24 via a transmitter 35 in this example such as part of a satellite carrying the space-borne spectrometer 22.

The spectrometer controller 34 is configured to encode the PCA scores and encode the residuals and correlate the collected FTS data against a plurality of PCA eigenvectors and generate the approximate interferogram based thereon. For example, the spectrometer controller 34 may be configured to buffer the collected FTS data and subtract the approximate interferogram from the buffered collected FTS data.

The ground-based processor 24 may be configured to generate uncompressed FTS data from the compressed FTS data. The spectrometer controller 34 may be configured to encode the PCA scores, and encode the residuals. The ground-based processor 24 may include a ground-based controller 36 that is configured to decode the encoded PCA scores from the compressed FTS data, decode the encoded residuals from the compressed FTS data, and generate decompressed FTS data from the decoded encoded PCA scores and decoded encoded residuals. The ground-based controller 36 may use the plurality of PCA eigenvectors to reconstruct the approximate interferogram and add the residuals to the reconstructed approximate interferogram to generate the decompressed FTS data.

Figure 2:
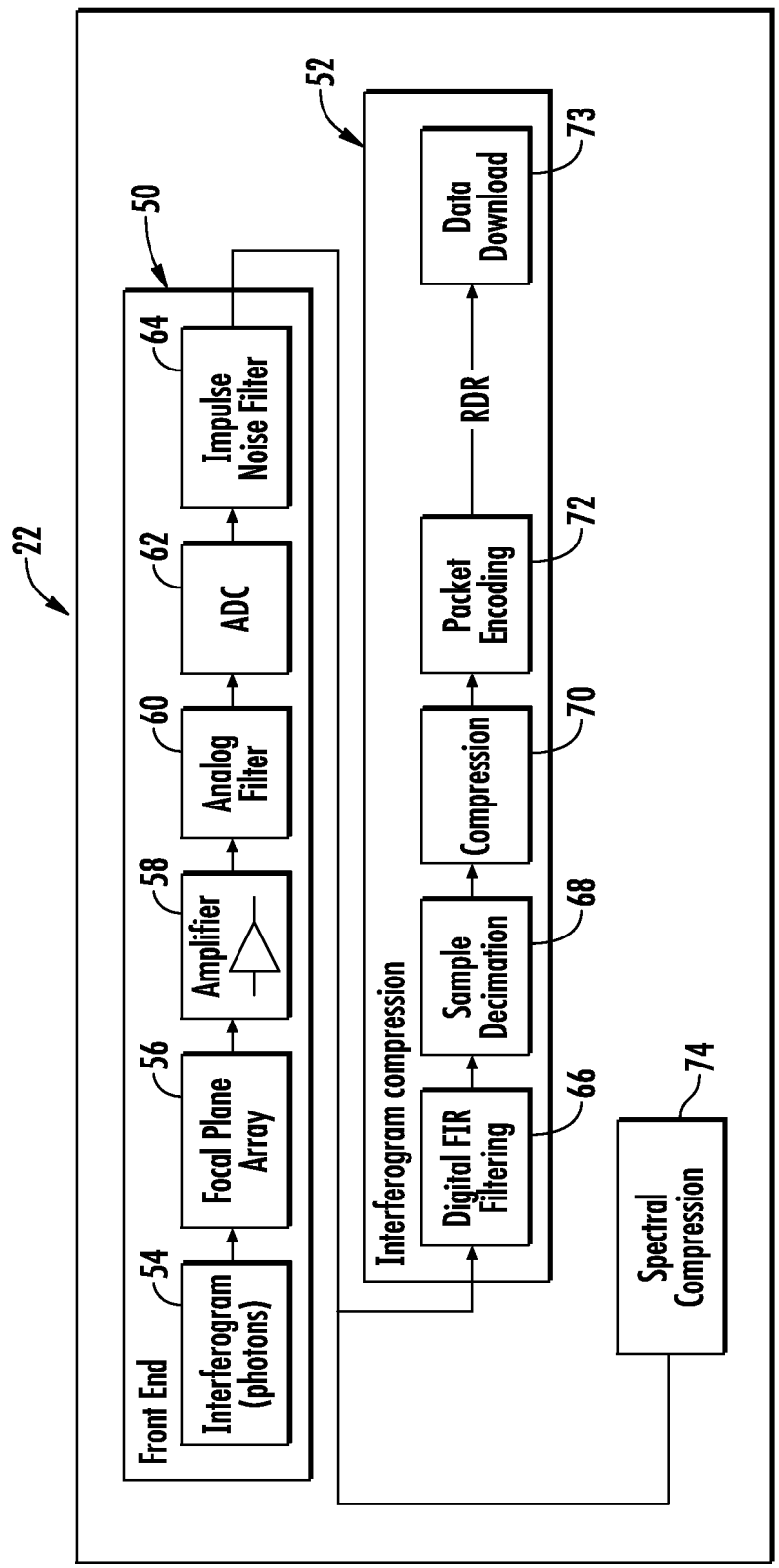
FIG. 2 is a block diagram showing the sequence of front end processing and interferogram compression that may be used in the spectrographic system of FIG. 1.

Referring now to FIG. 2, there is illustrated a block diagram showing the front end processing 50 and interferogram compression 52 that occurs at the space-borne spectrometer 22. The front end preprocessing 50 in conjunction with the interferometer 30 (FIG. 1) produces an interferogram 54 at the interferometer. The photons are collected and processed at a focal plane array 56 where signals from the array are produced and amplified 58 and filtered at an analog filter 60. The filtered data is converted into digital format at the analog-to-digital converter 62. The digital signals are processed at an impulse noise filter 64. The generated interferogram is then processed for interferogram compression 52, starting with the digital FIR (Finite Impulse Response) filtering 66, followed by sample decimation 68. Once decimation 68 occurs, the signals are compressed 70 to generate the compressed FTS data, followed by packet encoding 72 for real-time transmission and data download 73 from the satellite or other space-borne asset such as a spacecraft that incorporate the space-borne spectrometer 22. Spectral compression 74 may occur in another pipeline of data processing.

In order to reduce the sheer volume of the raw data from the interferometer 30 for interferogram processing, the FTS data is decimated by a large factor, typical between 10 and 20, which means the number of samples are reduced by that factor by only keeping every Nth sample. This sample decimation 68 as part of the interferogram compression 52 shown in FIG. 2, however, requires the front end preprocessing 50 to maintain good signal integrity. This front end preprocessing 50 includes digitally filtering the signal to avoid aliasing, such as with the illustrated impulse noise filter. This digital filter 66 is a complex valued filter, and thus, the originally collected sample values are not complex, but the values being compressed are complex. Real and imaginary components to the data are processed during interferogram compression 52, which compresses these two components with their own set of PCA (Principal Component Analysis) basis vectors, optimizing the compression performance. Both sets of real and imaginary components, however, go through the same process.

Processing and compressing the large volumes of FTS data may not be practical for the entire interferogram and the entire set of pixel elements. The interferograms for a large array of pixel elements may be collected concurrently, meaning that the arriving FTS data would need to be stored with the entire set of interferograms before processing may begin. To mitigate this need, the compression 70 (FIG. 2) processes segments of each interferogram as it arrives and reduces any memory buffer requirements.

The spectrographic system 20 uses PCA to decorrelate the information contained in the interferogram using basis vectors that represent the full range of atmospheric conditions. PCA is a common mathematical technique to extract information from a set of related data. An array of several thousand samples can be approximated with 10 to 20 of these basis vectors, resulting in 10 to 20 PCA score values to be encoded. Due to their wide distribution of magnitudes, a long word/short word encoding technique may be used.

The error between the original collected FTS data and the approximated data may be too large to meet data quality requirements, and therefore, the residual differences between the data are also encoded. The dynamic range of the residual differences are much smaller than the original FTS data, making them easier to encode with fewer bits. The dynamic range of these residuals are inversely proportional to the number of PCA scores that are encoded. Variable length Huffman codes are used to encode the Gaussian distributed residual values. Because the FTS interferograms are complex valued, this process may be applied separately to the real and imaginary components of the data. To increase the amount of compression, the residuals may be quantized to a lower precision, leading to higher compression, while incurring increased reconstruction error.

Because of the large data rate being generated, the compression process can be applied to smaller segments of the interferogram to reduce memory buffer requirements. The final compression performance may be assessed on the spectrum generated at a ground-based processor 24 because the spectrum is the final product of the spectrographic system 20.

Figure 3:
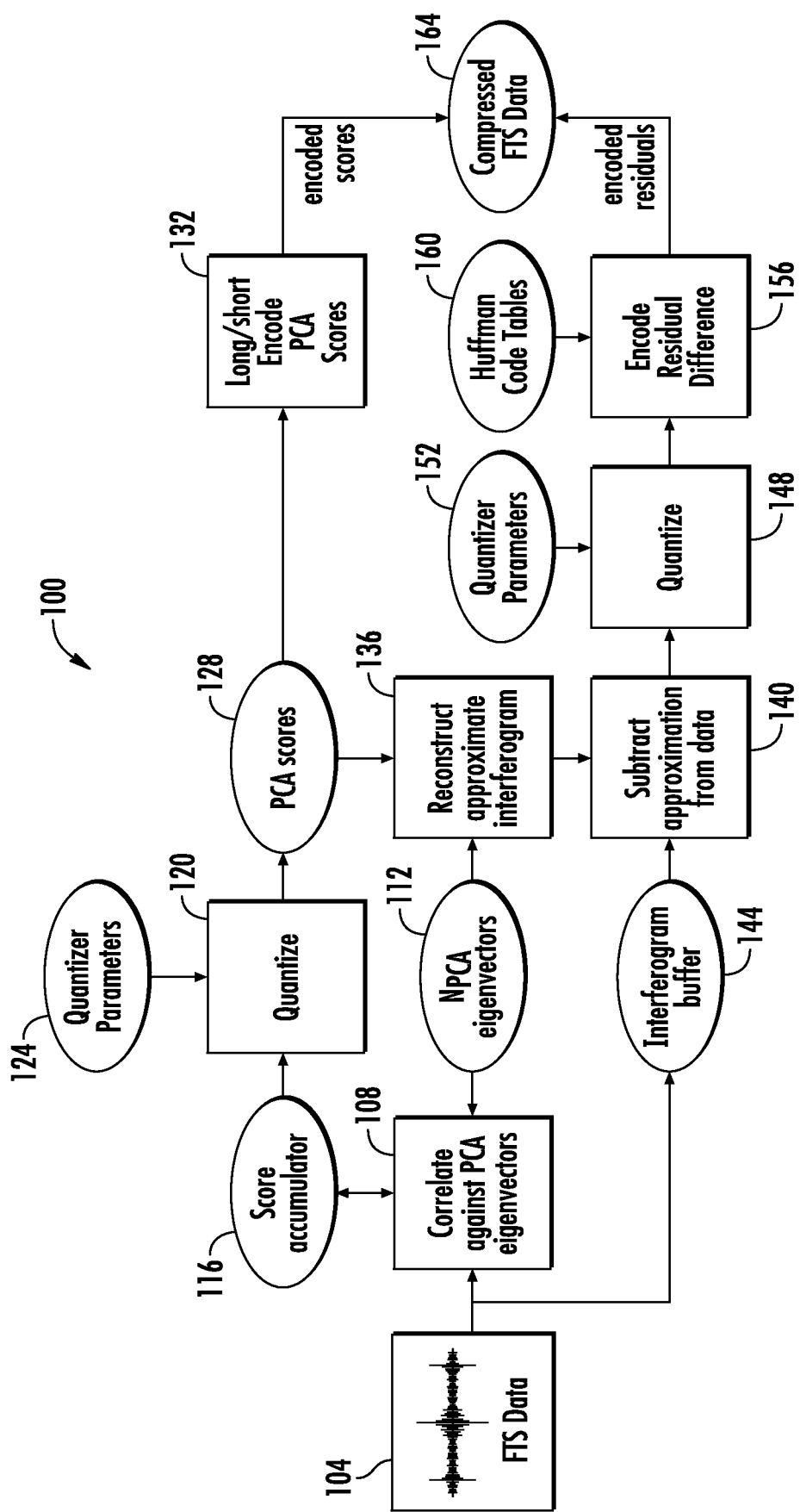
FIG. 3 is a high-level processing flow diagram for interferogram compression used with the spectrographic system of FIG. 1.

Referring now to FIG. 3, a detailed processing flow diagram of the compression performed at the spectrometer controller 34 is illustrated generally at 100 and begins with the incoming FTS data at 104. Generally, the compression algorithm depicted in FIG. 3 has its processing flow dividing into two main flows. One flow processes the incoming FTS data 104 by applying PCA to reduce the data into a handful of PCA scores that represent the main shape of the interferogram. The other flow uses the approximation represented by the PCA scores to improve the accuracy of the compressed interferogram by encoding the residual difference between the approximation and the original interferogram. As explained in greater detail below, the PCA score flow is primarily on the top-left and the residual encoding is primarily on the bottom right.

The processing starts with the FTS data 104 that is correlated against the collection of PCA basis eigenvectors 108 as a sum of sample-by-sample products after the mean of the PCA training data has been subtracted. PCA eigenvectors had been previously generated 112 through a PCA data training processing. Once the PCA scores are completely calculated within the score accumulator 116, they are quantized 120 based upon quantizer parameters 124 to integers and the PCA scores generated 128, then encoded with long/short encoded PCA scores 132. These quantized PCA scores 128 are also used for better decompression and used to generate or reconstruct an approximate interferogram 136 in the same manner that decompression processing will execute, such as at the ground-based processor 24. This approximate interferogram 136 is subtracted 140 from the original FTS data 104 to produce the residuals. The FTS data had been buffered 144 to make it available. The subtraction 140 generates the residual differences, which are quantized 148 based upon the quantizer parameters 152 and the residual differences encoded 156 into the data stream using data from variable length Huffman code tables 160, which processing also includes the ability to encode larger magnitude residual values as an escaped fixed length word.

The compressed FTS data 164 is formed from the encoded scores 132 and the encoded residuals 156. The quantization 120 applied to the PCA scores 128 is chosen in an example by a simple rounding-to-nearest-integer operation, which does not have a large impact on the accuracy of the approximate interferogram 136 and simplifies the processing. Any inaccuracies may appear in the residual differences, which can easily accommodate that level of error. When operating this compression process in a lossy mode, the quantization 148 of the residual difference is a trade-off between compression rate and reconstruction error level. Because PCA is primarily used to extract information from the FTS data, the residual differences encompass most of the system noises, and for that reason, some level of quantization is not impacting the actual accuracy from the data.

Although not illustrated in this high-level diagram, the FTS data may be broken into smaller segments, allowing for near real-time processing as the interferograms are collected to reduce the buffer memory requirements. The compression process may also incorporate fixed-point operations instead of floating-point operations, which facilitates its implementation on field programmable gate arrays.

Figure 4:
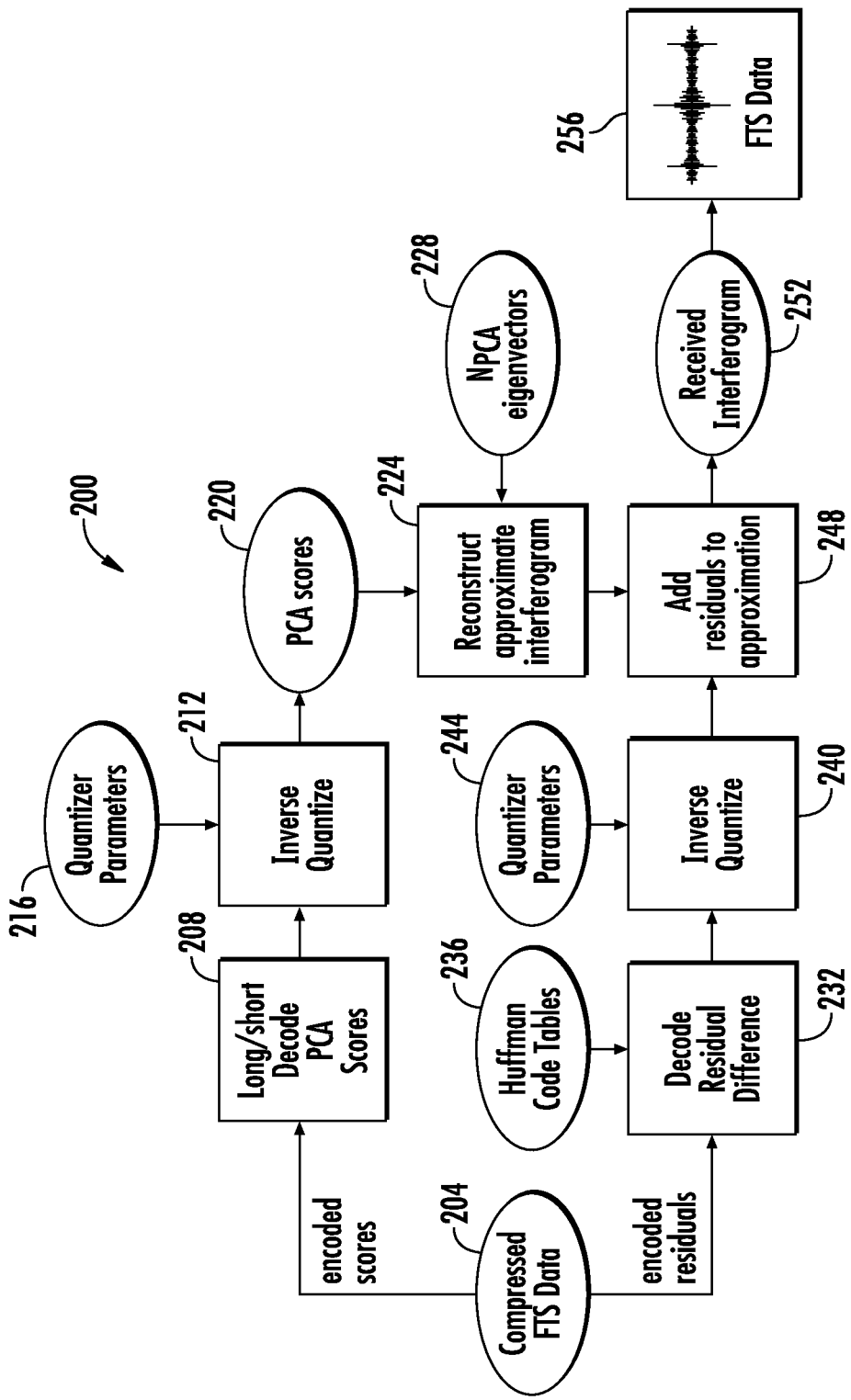
FIG. 4 is a high-level processing flow diagram of the interferogram decompression used with the spectrographic system of FIG. 1.

The decompression process is generally shown at 200 in FIG. 4 and inverts the process of the compression to reconstruct a version of the original data. The differences between this reconstructed data and the original data that were provided to the compression is the compression reconstruction error, often measured as a root-mean-squared (RMS) error. The decompression process receives the compressed FTS data 204 and splits it into the encoded scores and encoded residuals. The long/short decoding occurs of the PCA scores 208, followed by inverse quantization 212 based upon quantizer parameters 216. These values are used as PCA scores 220 to generate, i.e., reconstruct, the approximate interferogram 224 using eigenvectors 228. The encoded residual differences that were encoded as Huffman symbols are decoded 232 based upon the Huffman code tables 236, inverse quantized 240 by the quantizer parameters 244, and then added back to the approximate interferogram 248 to generate the reconstructed interferogram 252 and obtain the FTS data 256.

There now follows greater details explaining the mathematical functions and theory of the compression process. The symbols used in this following description are defined in Table 1. The numeric index ranges in this description are zero-based, indicating that if there are N elements, the range of indices are 0 to N−1, which simplifies calculating array pointers as compared to some programming functions that use one-based indexing into arrays.

TABLE 1

Algorithm Symbol Definition Table

| Symbol | Description |
| --- | --- |
| b | Spectral band identifier subscript (e.g., MSW and LW) |
| c | Complex component identifier subscript (real and imaginary) |
| i, j | Detector pixel array element row i and column j location subscript |
| k | Segment index subscript |
| m | PCA basis index subscript |
| n | Sample index subscript |
| p | Number of bits represent the fraction portion of the fixed-point value |
| $K_b$ | Number of segments for band b |
| $N_{b,k}$ | Number of segment samples for band b for segment k |
| $M_{b,k}$ | Number of basis vectors for band b for segment k |
| $I_{b,c,i,j,k,n}$ | Interferogram sample for band b, component c, element i, j, segment k, sample n |
| $\hat{I}_{b,c,i,j,k,n}$ | Normalized Interferogram for band b, component c, element i, j, segment k, sample n |
| $\tilde{I}_{b,c,i,j,k,n}$ | Decompressed interferogram for band b, component c, element i, j, segment k, sample n |
| $B_{b,c,k,n}$ | PCA basis vector sample for band b, component c, segment k, sample n |
| $\mu_{b,c,k,n}$ | PCA mean sample value for band b, component c, segment k, sample n |
| $q_{b,c,k}$ | Residual quantization factor for band b, component c, segment k |
| $a_{b,c,k}$ | Residual symbol offset for band b, component c, segment k |
| $S_{b,c,i,j,k,m}$ | PCA Score for band b, component c, element i, j, segment k, basis m |
| $\tilde{S}_{b,c,i,j,k,m}$ | Quantized PCA Score for band b, component c, element i, j, segment k, basis m |
| $A_{b,c,i,j,k,n}$ | Approximate interferogram for band b, component c, element i, j, segment k, sample n |
| $R_{b,c,i,j,k,n}$ | Residual value for band b, component c, element i, j, segment k, sample n |
| $\tilde{R}_{b,c,i,j,k,n}$ | Quantized residual value for band b, component c, element i, j, segment k, sample n |
| $b_{S,b,c,k}$ | Number of bits to encode the PCA score short word value for band b, component c, segment k |
| $b_{L,b,c,k}$ | Number of bits to encode the PCA score long word value for band b, component c, segment k |
| $b_{E,b,c,k}$ | Number of bits used to encode Huffman table escaped values for b, c, k |
| $b_{H,b,c,k,w}$ | Number of bits for Huffman codeword for band b, component c, segment k, symbol w |
| $H_{b,c,k,w}$ | Huffman codeword for band b, component c, segment k, symbol w |
| $N_{H,b,c,k}$ | Number of Huffman codewords in the table for band b, component c, segment k |

The algorithm configuration parameters control the action of the underlying compression process depicted in FIG. 3, and provide the flexibility to adapt to different data characteristics of different interferometer instruments. These configuration parameters may be preloaded into any spectrometer controller 34 (FIG. 1) to initialize execution. In an example, it is possible to insert these algorithm configuration parameters into the downlinked data stream from the transmitter 35 to the ground-based processor 24, allowing coordination between the processing at any ground-based processor and at a space-borne spectrometer 22 since these algorithm configuration parameters are used for decompressing the compressed interferogram data. As explained below, each algorithm configuration parameter is described as to its use, the expected data type and size, and the source of the configuration parameter values.

Figure 5:
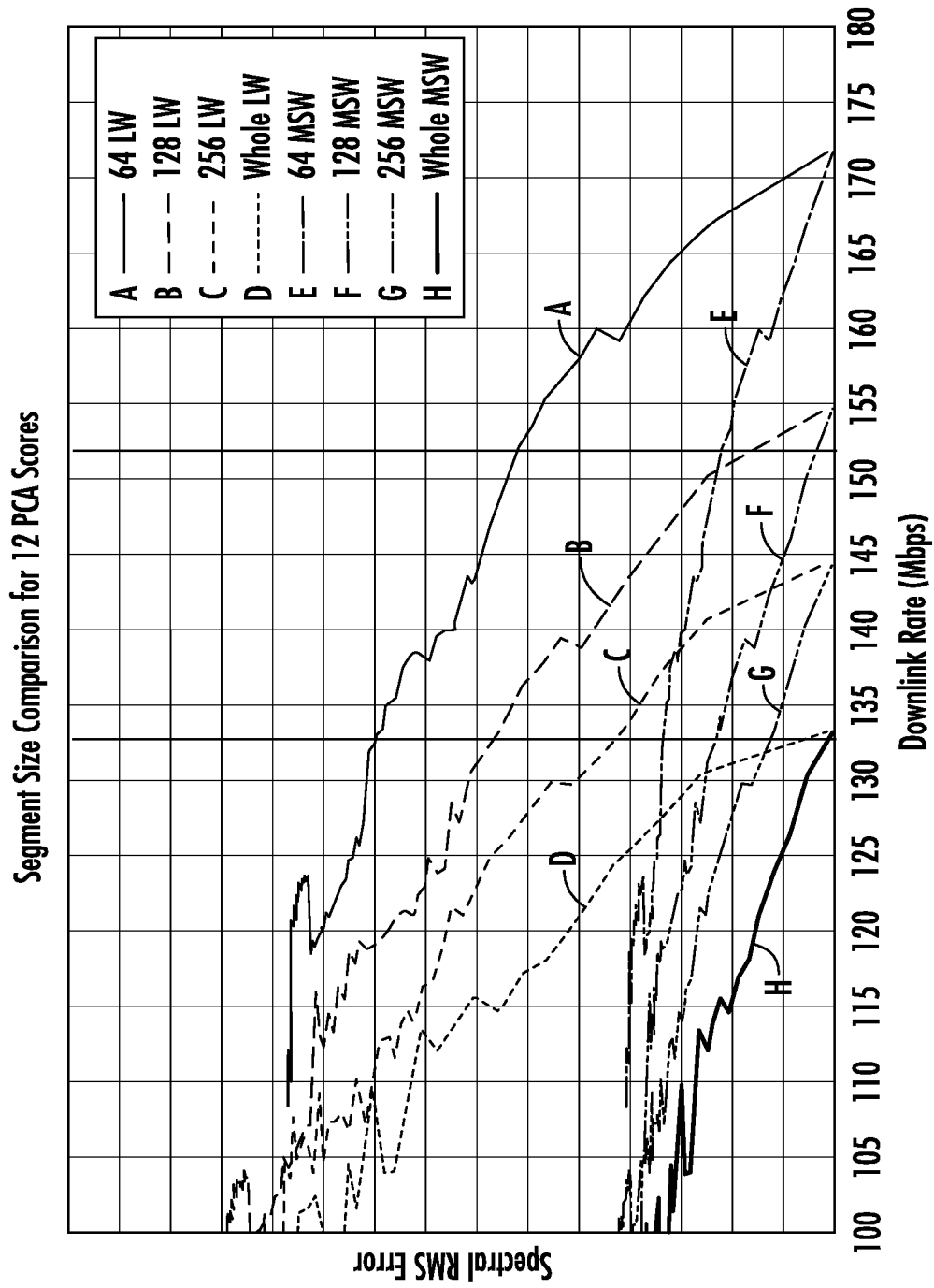
FIG. 5 is a graph showing a comparison of segment sizes for 12 PCA scores used in the interferogram compression and decompression flow sequences shown in FIGS. 3 and 4.

Referring to the graph shown in FIG. 5, a segment size comparison is shown for 12 PCA scores with the spectral RMS error on the vertical axis and the downlink rate on the horizontal axis. This graph helps explain how the change in the downlink rate may impact segment size.

The interferogram FTS data collected and preprocessed by the interferometer 30 may contain several thousand samples. For devices with larger format detector arrays, a tremendous amount of data is generated during each frame interval. In order to reduce the memory buffer requirements since the PCA process must process each vector as a whole, the compression process may compress the interferogram in segments, dividing it into more or less same-sized segments. The FTS data may be processed in smaller segments during a frame interval while the interferometer 30 is collecting data, which reduces the memory buffer requirements. This segmented processing may impact some compression performance. However, this is a trade-off between practical memory buffers and the compression rate for compression optimization.

Each band may have its data divided in to $K_b$ segments, where each segment length is $N_{b,k}$ samples. Both the real and imaginary components may use the same segmentation scheme. The number of segments and their lengths may be represented by a 16-bit unsigned integer, which will be sufficient to represent the length of any reasonable interferogram.

The fixed-point Parameter p may represent the number of bits as a fraction portion of the fixed-point value. The compression may occur on an FPGA, which is better suited for integer arithmetic than floating-point processing. It is possible to perform float-point processing. However, that type of processing requires a large library that uses much of the processing capacity, which is limited on a spaced-based implementation such as a satellite. The compression process may be expressed in fixed-point operations and represented as floating-point values as integers by assigning a number of the least significant bits to represent the fractional part of the value, and representing the value as a fraction, where the numerator is the integer value and the denominator is a power of two. The number of fractional bits in this compression process may be represented by the symbol p, which can be between 0 and 32 bits, but in an example, is set at 12 bits. This value is determined as part of the compression performance optimization and is set to be the smallest value that does not contribute significantly to the RMS error impact during compression. This value is expected to be a static parameter once the optimization for a particular application is completed.

The PCA mean vector $\mu_{b,c,k,n}$ corresponds to the PCA mean sample value for band b, component c, segment k and sample n. The first step of applying the PCA basis vectors to data is to remove the overall data mean determined by the training dataset. Each sample value in the interferogram may have a mean value to be subtracted. This mean value is represented by the symbol $\mu_{b,c,k,n}$, which is a 16-bit signed integer value matching the dynamic range of the interferogram or FTS data. Normally, this is a floating-point value in PCA. It was determined, however, that rounding these values to integers has a small impact to the compression performance, while significantly simplifying the compression algorithm implementation on FPGAs. An array of $N_{b,k}$ values for each band component segment may be required.

The PCA Basis Vectors $B_{b,c,k,n}$ corresponds to the PCA basis vector sample for band b, component c, segment k, and sample n. The PCA basis vectors are used to reduce the interferogram FTS data to a handful of PCA score values that can be used to approximate the interferogram signal. Each band component segment may have a set of $M_{b,k}$ PCA basis vectors that are $N_{b,k}$ element fixed-point arrays whose values are represented by the symbol $B_{b,c,k,n}$. These vectors are mathematically correlated against their corresponding segment of the interferogram gain to generate fixed-point PCA score values that are rounded to integer values. These PCA basis vectors are generated from the PCA on a training dataset of interferograms as part of the compression optimization process.

The PCA Score Encoding Parameters $b_{S,b,c,k}$ corresponds to the number of bits to encode the PCA score short word value for band b, component c, and segment k, and $b_{L,b,c,k}$ corresponds to the number of bits to encode the long word value. The distribution of PCA score values allows encoding with two sizes of integer words. Many of the PCA score values may be represented in fewer bits than what is required to encode the maximum values, which may improve compression rate. There are two parameters that describe this encoding: (1) the number of short word bits $b_{S,b,c,k}$; and (2) the number of long word bits $b_{L,b,c,k}$. Both values may be represented in 8-bit unsigned integers, which allows the dynamic range to run from 0 to 16 or more. These values are determined when optimizing the compression process.

The residual values are quantized from the floating-point values represented in a fixed-point format to integers so that they can be encoded as channel symbols using Huffman encoding. The scale factor that controls the compression and RMS error is the quantization bin size $q_{b,c,k}$, which is a fixed-point value that specifies the range of values that are represented by each resulting integer. There is a quantization bin size for each band component segment allowing for variable control over different regions of the interferogram.

There are residuals encoding parameters $a_{b,c,k}$, $b_{E,b,c,k}$, $b_{H,b,c,k,w}$, & $H_{b,c,k,w}$. The residual values are encoded using variable length coding utilizing Huffman tables that have been optimized for each band component segment. To convert the quantized residuals into integers that represent the Huffman symbol index w, the codeword as a 16-bit signed integer offset value represented by the symbol $a_{b,c,k}$ is added. For those rare values that are not represented by the Huffman code table due to the larger values, the extra values beyond the range of the table are encoded in a fixed-length unsigned integer value using $b_{E,b,c,k}$ bits in the data stream immediately following the Huffman code. The Huffman codeword tables contains $N_{H,b,c,k}$ symbols, where each variable-length codeword element $H_{b,c,k,w}$ is $b_{H,b,c,k,w}$ bits long. There is a separate Huffman codeword table for each band component segment in order to maintain maximum flexibility during compression. The escape value and codeword sizes can be represented in 8-bit unsigned integer values and the Huffman codeword bit patterns may fit within a 16-bit unsigned integer. These parameters may be generated when optimizing the compression processing, which may generate a compressed data stream that contains the information required to reconstruct the compressed interferogram, including the PCA scores and residual differences.

Each of the PCA scores $\tilde{S}_{b,c,i,j,k,m}$ is encoded into the data stream as one of two sizes of a signed integer, i.e., a short word and a long word. These values are encoded as signed integers using the IEEE two's-complement representation, having the number of bits required to represent the magnitude and sign of the value. As described above, the number of bits allocated for the short word is $b_{S,b,c,k}$ and the number for the long word is $b_{L,b,c,k}$. The PCA scores are placed into the data stream at the beginning of the band component segment data in the primarily order of the basis vectors.

The residual differences are encoded in the data stream as variable-length Huffman codes. The symbol codeword $H_{b,c,k,w}$ is selected out of a table of $N_{H,b,c,k}$ elements for each value and is encoded $b_{H,b,c,k,w}$ bits. In general, the Huffman tables have been generated to contain enough symbol codewords to represent the majority of the dynamic range of the quantized residual differences. Occasionally, however, there are residual values that exceed the range represented by the assigned table. These values are encoded using an additional fixed-length unsigned integer word. Those values that are greater than the maximum value represented by the Huffman table are encoded as the Huffman codeword for the largest represented value and followed by $b_{E,b,c,k}$ bits to encode the difference between the value and largest Huffman value. Those values that are less than the minimum value represented by the Huffman table are encoded as the Huffman codeword for the smallest represented value and followed by $b_{E,b,c,k}$ bits to encode the difference between the value and the smallest Huffman value.

An initial packet format for the data stream may include different data fields. Because of the relatively small size of the segments, it is possible that interferogram segments from several pixel elements may need to be combined into the same packet so that the packet header overhead is optimized.

Default parameters, such as packet type and timestamp, may be part of the packet standard. The timestamp may be used to establish the time of interferogram collection. Other parameters may be used to extend the packet header and allow faster sorting of incoming data. These parameters may be the number of interferogram segments contained in the packet, the identifiers for the pixel elements included in the packet (an index, a row, and column position), the band identifier, and the segment identifier. It is assumed that the real and imaginary components for each band segment may be encoded in the same packet. The number of bytes used in the data field for each band segment component may be placed directly in the data field, although it is possible to place it in the header.

The data field of the packet may contain the compressed interferogram data. Each band pixel element's interferogram segment may be placed in the data field corresponding to the order in the auxiliary packet header. Both the real and imaginary component data may be placed in consecutive order in the stream as shown in the data stream format illustrated in FIG. 6 generally at 300, showing different PCA scores and residuals. At the beginning of each band segment component, a two-byte unsigned integer may be placed in the data stream to indicate how many of the following bytes are part of that component's compressed data. If the compression does not result in an integer number of bytes, the final byte may be padded with zeros and the number of bytes field may specify that number of bytes. The real component is placed in the data stream followed by the imaginary component of that same element's segment. Within a component's data the PCA scores may be placed first followed by the residuals.

Figure 12:
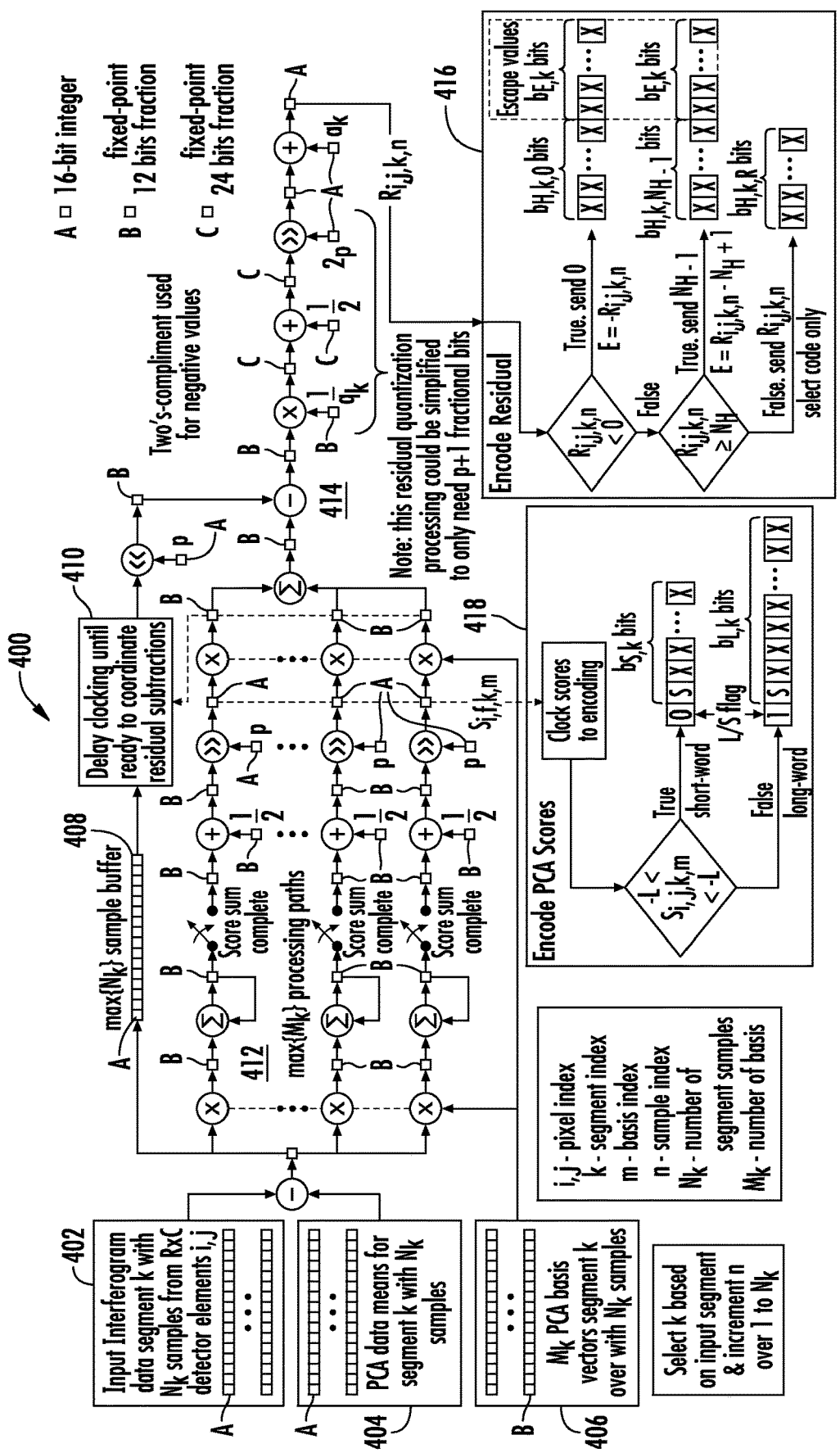
FIG. 12 is another high-level schematic flow diagram of a portion of the compression sequence shown in FIG. 3.

The compression process is now described relative to the mathematical steps applied to the data and the output encoding. A draft data field format is also described. Multiple processing paths may be implemented to separately process the radiometric bands and complex value components may be processed in parallel to improve throughput. A schematic illustrating some of the mathematical operations of the compression process is shown in FIG. 12 as explained in greater detail below.

The interferogram compression process operates even with the on-board processing limitations associated with satellites and other space-borne craft. The compression process may be implemented on an FPGA, where integer operations are preferred over floating-point operations, which would require a larger resource allocation. For that reason, the compression process may use integer and fixed-point values, which represent floating point values.

As noted before, the definitions of the symbols used in the compression process are listed in Table 1. The compression process assumes a zero-based indexing structure, which primarily impacts the Huffman codeword symbol indices. It is possible to use a MATLAB® reference implementation based on one-based indexing since it is the array indexing used in that environment.

The FTS data may be processed in interferogram segments since the detector elements collect data in parallel as the interferometer scans through the range of optical path differences. Each sample may contain a real and imaginary component due to the FIR filtering required for the decimation. As each segment arrives, it is buffered to maintain the data for all the detector elements, and the data for each detector element may be processed in turn. Processing of all of the segment data is completed before the next segment is collected. It is possible to have two input buffers: the first buffer to contain the segment being processed and the second buffer to contain the segment being collected. For each detector element, data may be clocked to calculate the PCA scores.

A first step for applying the PCA basis vectors is to subtract the overall mean from the input interferogram data for all samples in the band segment component and calculate the normalized interferogram.

$$\hat{I}_{b,c,i,j,k,n} = (I_{b,c,i,j,k,n} - \mu_{b,c,k,n}) \qquad \text{signed integer (Eq 1)}$$

The next step is to apply each of the $M_{b,k}$ basis vectors to the normalized interferogram data.

$$S_{b,c,i,j,k,m} = \sum_{n=1}^{N_k} B_{b,c,k,m,n} \cdot \hat{I}_{b,c,i,j,k,n} \qquad \text{(Eq 2)}$$

fixed-point

The final step to generate the PCA Scores that are inserted into the compressed data stream is to quantize these fixed-point values to integers by rounding these values. The value $2^{p-1}$ is equal to 0.5 in the fixed-point representation. The operation symbol >>p indicates bit-shifting the integer a fixed-point value by p bits, which is equivalent to dividing by $2^p$. The operation symbol $\lfloor \cdot \rfloor$ indicates taking the floor, which automatically happens when bit-shifting the fixed-point integer values, and is included to emphasize that the results are integers.

$$\tilde{S}_{b,c,i,j,k,m} = \lfloor (2^{p-1} + S_{b,c,i,j,k,m}) >> p \rfloor \qquad \text{signed integer (Eq 3)}$$

The residuals differences are calculated and encoded to provide radiometric precision of the interferogram, which is mirrored as part of the decompression processing at the ground-based processor 24, for example. The approximate interferogram is calculated based on the quantized PCA scores. The approximate interferogram is calculated as a weighted sum of the PCA basis vectors where the weights applied to each basis is the calculated quantized PCA score. Because the PCA basis vector values are represented using fixed-point values, and the quantized PCA scores are integers, their product sum will result in fixed-point values.

$$A_{b,c,i,j,k,n} = \sum_{m=1}^{M_k} B_{b,c,k,m,n} \cdot \tilde{S}_{b,c,i,j,k,m} \qquad \text{(Eq 4)}$$

fixed-point

The approximate interferogram is next subtracted from the original. In order to accomplish this, since the approximate interferogram is fixed-point and the original interferogram is an integer, the original data are converted to fixed-point by bit shifting their values by p bits as indicated in by the operation symbol <<p. This operation is executed for all values in the band segment component resulting in fixed-point values representing the residual differences.

$$R_{b,c,i,j,k,n} = (\hat{I}_{b,c,i,j,k,n} << p) - A_{b,c,i,j,k,n} \qquad \text{fixed-point (Eq 5)}$$

The final step in generating the residual difference values that are encoded in the compressed data stream is to quantize the residual differences and convert them from fixed-point values to integers. This is accomplished by dividing each value by the quantization bin size $q_{b,c,k}$ and adding 0.5 represented in fixed-point by $2^{2p-1}$ and bit-shifting down by 2p indicated by the operation symbol >>(2p). The division by the quantization bin-size is accomplished by multiplying the reciprocal represented in fixed-point with p fractional bits. When multiplying two fixed-point values, the number of fraction bits add, and this product contains 2p fractional bits, requiring the 0.5 offset to be represented with a fixed-point having 2p fractional bits. Truncating back to an integer requires the bit-shift of 2p bits. An integer offset $a_{b,c,k}$ is added to this quantized value to shift to the indexing scheme of the Huffman table. This operation may still result in a signed integer value.

$$\tilde{R}_{b,c,i,j,k,n} = \left\lfloor \left( \frac{1}{q_{b,c,k}} \cdot R_{b,c,i,j,k,n} + 2^{2p-1} \right) >> (2p) \right\rfloor + a_{b,c,k} \qquad \text{(Eq 6)}$$

signed integer

The PCA Scores are encoded using a lossless short word/long word encoding that allows each value of a large dynamic range to be represented by one of two sizes of signed integer values. For each value there is a single bit flag that indicates which of the two sizes are being used for that value. This technique is efficient when encoding a large dynamic range of values, where many of the values are significantly smaller than the maximum value, which offsets the cost of having the flag.

For each PCA score to be encoded, its value is checked against the dynamic range of the short word to determine if it will be encoded using the short word number of bits or the long word number of bits.

$$f_{b,c,i,j,k,m} = \begin{cases} 0 & -2^{(b_{S,b,c,k}-1)} \leq \tilde{S}_{b,c,i,j,k,m} < 2^{(b_{S,b,c,k}-1)} \\ 1 & \text{otherwise} \end{cases} \quad \text{(Eq 7)}$$

flag bit

Figures 6, 7:
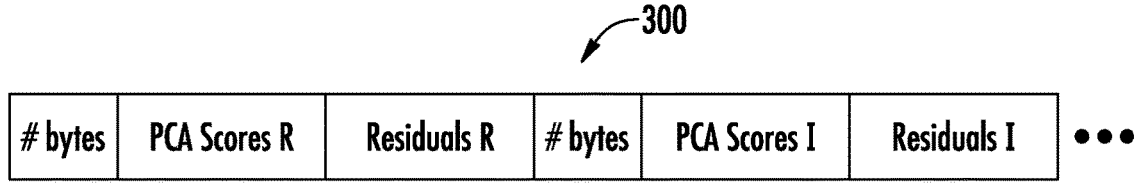
FIG. 6 is a table showing the ordering of a data field in a packet that contains compressed interferogram data used in the spectrographic system of FIG. 1.
FIG. 7 is a table showing examples of two-complement signed integer representations used in the spectrographic system of FIG. 1.
Figure 8:
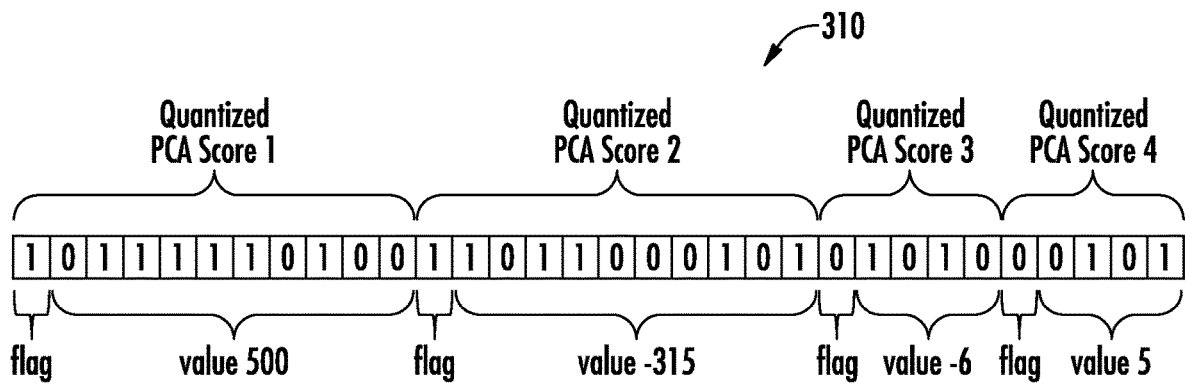
FIG. 8 is an example of short-word/long-word encoding for quantizing PCA scores using the spectrographic system of FIG. 1.

Once it is determined whether the PCA score value fits within a short word, or whether it will require a long word, it is written to the data stream by placing the single bit word-size flag followed by the PCA score encoded in the number of bits specified by this selection, $b_{S,b,c,k}$ for short-words and $b_{L,b,c,k}$ for long-words. The signed integer values are written into the data stream as two-complement values. Examples are shown in the table of FIG. 7, indicating the 5-bit, 10-bit, and 13-bit values. An example of several long-words and short-words that may be written into a data stream are expressed in the packet word format generally shown in FIG. 8 at 310, showing examples of the quantized PCA scores 1-4.

Figure 9:
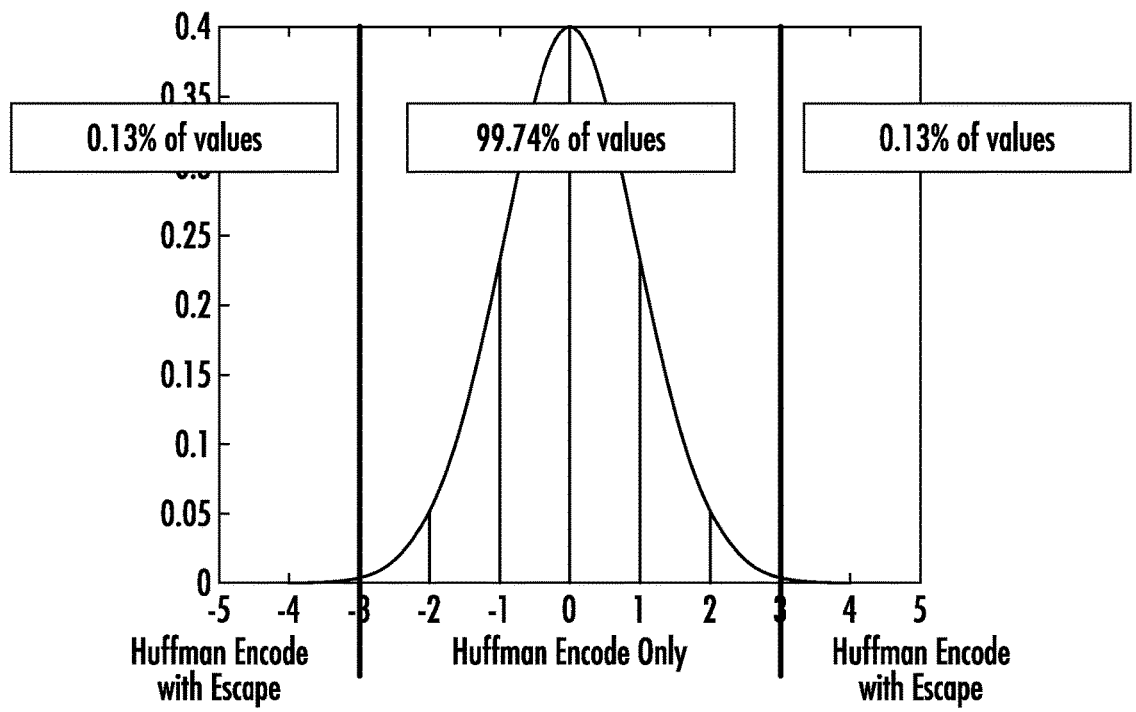
FIG. 9 is a graph showing a Gaussian distribution of Huffman encoding with and without escape values using the spectrographic system of FIG. 1.

Residual values may be Gaussian distributed, indicating the probability that any particular value may be determined by the Gaussian distribution. The residual values may be encoded using a range limited Huffman codeword table that may encode a majority of the values, but also allow for a value escape feature that may encode these rare large values. The graph in FIG. 9 illustrates this approach by showing a Gaussian distribution curve with the range limits of an example Huffman codeword table.

Those values within range of the Huffman table may be encoded by sending the Huffman codeword. For those values less than the range, the Huffman codeword may represent the smallest value, which indicates that an additional set of bits may follow to represent the rest of the value. A similar approach is taken for the values that are too large for the Huffman codeword table and its direct encoding. The values for the Huffman codeword table at 0 and $N_{H,b,c,k}-1$ may have the addition escape value added to the data stream. These escape values may be calculated in a manner to be a positive value and may use the full range of 0 to $2^{b_{E,b,c,k}}-1$.

$$\text{datastream} = \begin{cases} H_{b,c,k,0} \text{ in } b_{H,b,c,k,0} \text{ bits} & -w \text{ in } b_{E,b,c,k} \text{ bits} & w \leq 0 \\ H_{b,c,k,w} \text{ in } b_{H,b,c,k,w} \text{ bits} & \cdots & 0 < w < N_{H,b,c,k}-1 \\ H_{b,c,k,(N-1)} \text{ in } b_{H,b,c,k,(N-1)} \text{ bits} & w-(N_{H,b,c,k}-1) \text{ in } b_{E,b,c,k} \text{ bits} & w \geq N_{H,b,c,k}-1 \end{cases} \quad \text{(Eq 8)}$$

bit pattern

Figures 10, 11:
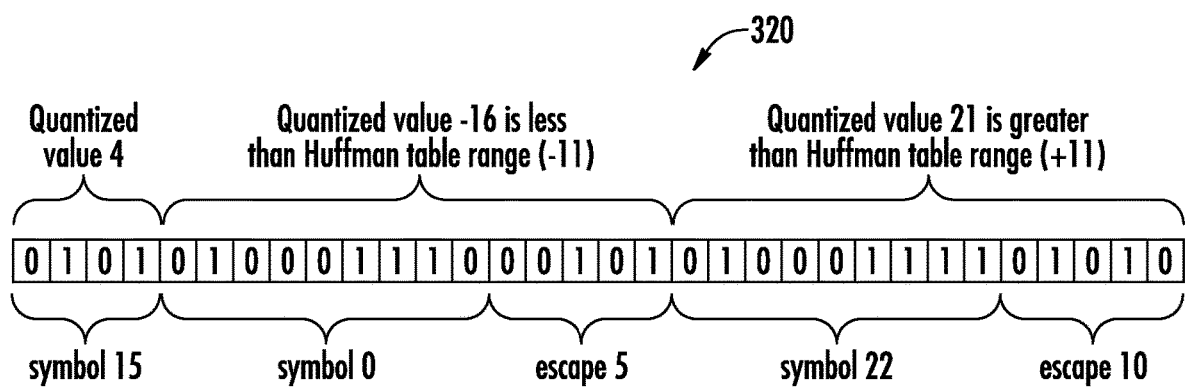
FIG. 10 is a table showing examples of Huffman variable-length code words used in the spectrographic system of FIG. 1.
FIG. 11 is a table showing an example of Huffman coding with escape values in three situations using the spectrographic system of FIG. 1.

To illustrate this operation through an example, the table in FIG. 10 provides an example Huffman codeword table containing a number of entries and demonstrating variable-length codewords. The symbol index is the same as the quantized residual values with the offset to convert it to a symbol index from the operation described above. Since there are 23 values, the symbol index 0 represents a quantized residual value of −11. The 23rd symbol represents quantized value of 11. Any quantized residual value that falls between −10 and 10 may use the Huffman table symbol. Values outside of this range may have the additional $b_{E,b,c,k}$ bit escape value appended to the data stream.

In the quantized value example shown generally at 320 in FIG. 11, different symbols are illustrated. The first quantized residual value of 4 is encoded with the Huffman symbol of 15, after adding the table offset value of 11. The second quantized value of −16 maps to a Huffman symbol of −5 so the Huffman symbol index 0 is placed in the data stream and the escape value of 5 follows it. The last quantized value maps to 32 and is larger than the number of symbols in the tables, so the last symbol of the table used with and escape value of 10 follows it.

The schematic diagram in FIG. 12 illustrates these mathematical principles and shows another compression sequence 400 and an input interferogram 402 and PCA data 404 and PCA basis vectors 406. The sample buffer 408 is shown and a delay unit 410 for the clock and the multiple processing paths indicated generally at 412. Residual quantization is shown at 414 and the residual encoding 416 and PCA score encoding 418. In the schematic, the 16-bit integers are labeled as the square "A" and the fixed-point 12-bits fraction by the square "B" and the fixed-point 24-bits fraction by the square "C."

Starting at left side of the figure, the interferogram data arrives for compression in segments for each pixel element. Each pixel element's data is fully processed before iterating the next pixel element. First the PCA means vector is subtracted which is fed into independent PCA basis application paths and to a temporary buffer 408 for later use in the residual processing. Each PCA basis application path accumulates the product sum of the incoming data with its specific basis vector for the band segment component being processed.

Once the full accumulate is finished the fixed-point PCA score values are quantized and sent to a PCA score encoder for generating the approximate interferogram. The PCA scores are used as weights in the weighted sum to generate the approximate interferogram which is subtracted from the normalized interferogram data to create the residual differences. These residual differences are then quantized and sent to a residual difference encoder and that data inserted into the data stream.

Decompression inverts the processing executed on the interferogram data during compression. The data stream is decoded back into PCA scores and residuals and the interferogram reconstructed. This may not be an exact copy of the original if the compression was operated in a lossy manner driven by the residual quantization bin size.

Decoding the PCA scores retrieves the signed integer values from the data. The number of bits retrieved from the stream is dependent on the short-word/long-word flag that precedes the value in the data stream. These signed integer values are in two-complement format, which expands into the natural width of the decompression algorithm environment, allowing the bits to expand to the full width. Because the PCA Scores are rounded to the nearest integer during compression, no scaling is required to return these values to the proper range.

The residual values may require decoding of the Huffman codeword from the data stream, which is typically implemented as a binary tree search. Once a valid Huffman codeword symbols is retrieved, it is compared to 0 and $N_{H,b,c,k}$ to check if there is an escape value to be included.

If there is an escape value, the next $b_{E,b,c,k}$ bits are read from the data stream to retrieve the unsigned integer offset value. The final retrieved values are the equivalent Huffman codeword symbol indices that will be inverted to residuals values during the interferogram reconstruction process.

Once the PCA scores and residuals are decoded for a band segment component, the corresponding interferogram segment data can be mathematically reconstructed by converting the residual Huffman symbol index to the approximate residual value by adding table symbol offset and multiplying by the quantization bin size, then added the approximate interferogram using the PCA scores and adding the PCA mean vector as in the following:

$$\tilde{I}_{b,c,i,j,k,n} = q_{b,c,k} \cdot (\tilde{R}_{b,c,i,j,k,n} + a_{b,c,k}) + \mu_{b,c,k,n} + \sum_{m=1}^{M_k} B_{b,c,k,m,n} \cdot \tilde{S}_{b,c,i,j,k,m} \quad \text{(Eq 9)}$$

Figure 13:
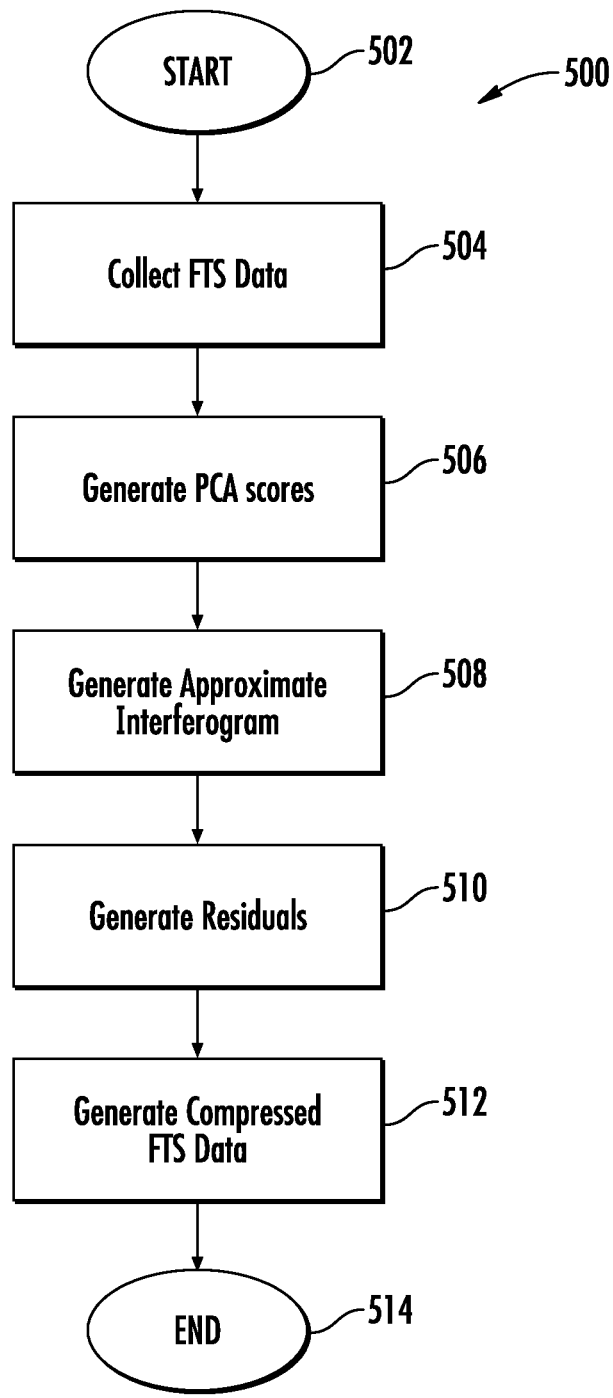
FIG. 13 is a high-level flowchart of a method for operating the spectrographic system of FIG. 1.

Referring now to FIG. 13, a high-level flowchart of a spectrographic method, in accordance with a non-limiting example, is shown a generally at 500. The method starts (Block 502) and the process continues by operating a space-borne spectrometer controller to cooperate with a detector array to collect FTS data (Block 504). The method generates PCA scores from the collected FTS data (Block 506) and generates an approximate interferogram based upon the PCA scores and the collected FTS data (Block 508). Residuals are generated based upon the approximate interferogram (Block 510) and compressed FTS data are generated based upon the PCA scores and residuals to be sent to the ground-based processor (Block 512). The process ends (Block 514).

Many modifications and other embodiments of the invention will come to the mind of one skilled in the art having the benefit of the teachings presented in the foregoing descriptions and the associated drawings. Therefore, it is understood that the invention is not to be limited to the specific embodiments disclosed, and that modifications and embodiments are intended to be included within the scope of the appended claims.

The invention claimed is:

1. A spectrographic system comprising:
a space-borne spectrometer and a ground-based processor in communication therewith;
the space-borne spectrometer comprising
an interferometer,
a detector array downstream from the interferometer, and
a spectrometer controller configured to
cooperate with the detector array to collect Fourier Transform Spectral (FTS) data,
generate and quantize Principle Component Analysis (PCA) scores from the collected FTS data,
generate an approximate interferogram based upon the quantized PCA scores and the collected FTS data,
encode the quantized PCA scores,
generate residual differences based upon a difference between the FTS data and the approximate interferogram,
quantize and encode the residual differences, and
generate compressed FTS data based upon the quantized and encoded PCA scores and the quantized and encoded residual differences to be sent to the ground-based processor.

2. The spectrographic system of claim 1, wherein the spectrometer controller is configured to correlate the collected FTS data against a plurality of PCA eigenvectors and generate the approximate interferogram based thereon.

3. The spectrographic system of claim 2, wherein the spectrometer controller is configured to buffer the collected FTS data, and subtract the approximate interferogram from the buffered collected FTS data.

4. The spectrographic system of claim 1, wherein the ground-based processor is configured to generate uncompressed FTS data from the compressed FTS data.

5. The spectrographic system of claim 4, wherein the ground-based processor comprises:
a ground-based controller configured to
decode and inverse quantize the quantized and encoded PCA scores from the compressed FTS data,
decode and inverse quantize the quantized and encoded residual differences from the compressed FTS data, and
generate decompressed FTS data from the decoded inverse quantized, quantized and encoded PCA scores and decoded inverse quantized, quantized and encoded residual differences.

6. The spectrographic system of claim 5, wherein the ground-based controller is configured to use a plurality of PCA eigenvectors to reconstruct the approximate interferogram.

7. The spectrographic system of claim 6, wherein the ground-based controller is configured to add the residual differences to the reconstructed approximate interferogram to generate the decompressed FTS data.

8. A spectrometer for space-borne use comprising:
an interferometer;
a detector array downstream from the interferometer; and
a spectrometer controller configured to
cooperate with the detector array to collect Fourier Transform Spectral (FTS) data,
generate and quantize Principle Component Analysis (PCA) scores from the collected FTS data,
generate an approximate interferogram based upon the quantized PCA scores and the collected FTS data,
encode the quantized PCA scores,
generate residual differences based upon a difference between the FTS data and the approximate interferogram,
quantize and encode the residual differences, and
generate compressed FTS data based upon the quantized and encoded PCA scores and the quantized and encoded residual differences to be sent to a ground-based processor.

9. The spectrometer of claim 8, wherein the spectrometer controller is configured to correlate the collected FTS data against a plurality of PCA eigenvectors and generate the approximate interferogram based thereon.

10. The spectrometer of claim 9, wherein the spectrometer controller is configured to buffer the collected FTS data, and subtract the approximate interferogram from the buffered collected FTS data.

11. A ground-based processor for use with a space-borne spectrometer configured to generate compressed Fourier Transform Spectral (FTS) data from collected FTS data, the ground-based processor comprising:
a receiver configured to receive the compressed FTS data from the space-borne spectrometer, the compressed FTS data comprising quantized and encoded PCA scores and quantized and encoded residual differences, the quantized and encoded residual differences being based upon a difference between the collected FTS data and an approximate inteferogram; and a ground-based controller coupled to the receiver and configured to decode and inverse quantize the quantized and encoded PCA scores from the compressed FTS data, decode and inverse quantize the quantized and encoded residual differences from the compressed FTS data, and generate decompressed FTS data from the decoded inverse quantized, quantized and encoded PCA scores and the decoded inverse quantized, quantized and encoded residual differences.

12. The ground-based processor of claim 11, wherein the ground-based controller is configured to use a plurality of PCA eigenvectors to reconstruct the approximate interferogram.

13. The ground-based processor of claim 11, wherein the ground-based controller is configured to add the residual differences to the reconstructed approximate interferogram to generate the decompressed FTS data.

14. A spectrographic method comprising:

operating a space-borne spectrometer controller to cooperate with a detector array to collect Fourier Transform Spectral (FTS) data, generate and quantize Principle Component Analysis (PCA) scores from the collected FTS data, generate an approximate interferogram based upon the quantized PCA scores and the collected FTS data, encode the quantized PCA scores, generate residual differences based upon a difference between the FTS data and the approximate interferogram, quantize and encode the residual differences, and generate compressed FTS data based upon the quantized and encoded PCA scores and the quantized and encoded residual differences to be sent to a ground-based processor.

15. The method of claim 14, wherein the spectrometer controller correlates the collected FTS data against a plurality of PCA eigenvectors and generates the approximate interferogram based thereon.

16. The method of claim 15, wherein the spectrometer controller buffers the collected FTS data, and subtracts the approximate interferogram from the buffered collected FTS data.

17. The method of claim 14, comprising operating the ground-based processor to generate uncompressed FTS data from the compressed FTS data.

18. The method of claim 17, wherein operating the ground-based processor comprises operating a ground-based controller to decode and inverse quantize the quantized and encoded PCA scores from the compressed FTS data, decode and inverse quantize the quantized and encoded residual differences from the compressed FTS data, and generate decompressed FTS data from the decoded inverse quantized, quantized and encoded PCA scores and decoded inverse quantized, quantized and encoded residual differences.

19. The method of claim 18, wherein the ground-based controller uses a plurality of PCA eigenvectors to reconstruct the approximate interferogram.

20. The method of claim 19, wherein the ground-based controller adds the residual differences to the reconstructed approximate interferogram to generate the decompressed FTS data.

* * * * *